Nov. 4, 1924.
H. C. GREENBROOK
BREAD CUTTER
Filed May 16, 1924
1,513,983
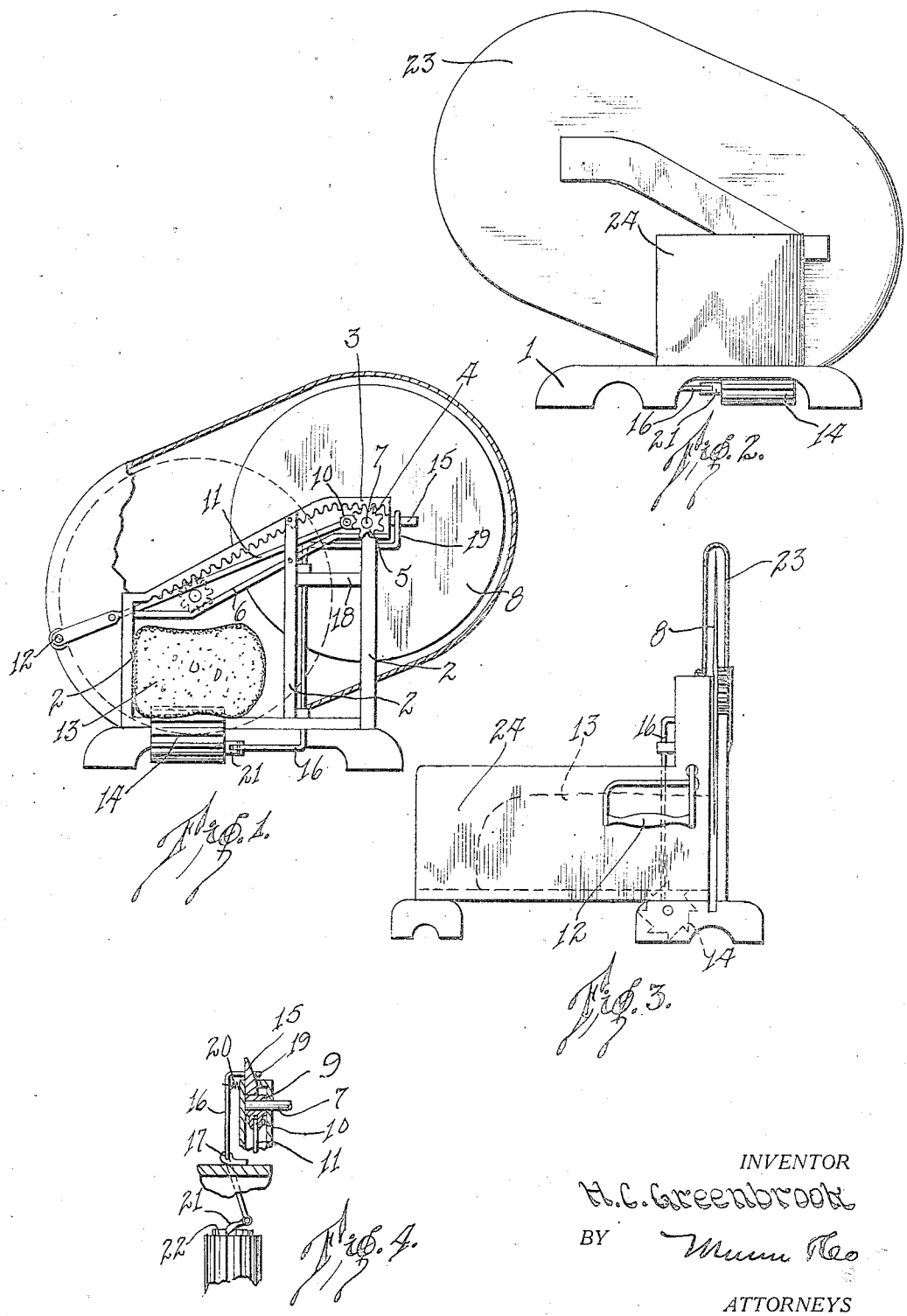
INVENTOR
H.C. Greenbrook
BY
ATTORNEYS Patented Nov. 4, 1924.

1,513,983

UNITED STATES PATENT OFFICE.

HANS C. GREENBROOK, OF CHICAGO, ILLINOIS.

BREAD CUTTER.

Application filed May 16, 1924. Serial No. 713,789.

*To all whom it may concern:*

Be it known that I, HANS C. GREENBROOK, a citizen of the Kingdom of Denmark, and a resident of Chicago, in the county of Cook and State of Illinois, have invented a new and useful Improvement in Bread Cutters, of which the following is a full, clear, and exact description.

My invention relates to improvements in bread cutters, and it consists in the combinations, constructions and arrangements herein described and claimed.

An object of my invention is to provide a bread cutter by means of which a single slice of bread may be severed from the loaf, having a predetermined and uniform thickness, and additional slices of the same thickness severed at will, and in desired quantities, until the entire loaf is consumed. My improved bread cutter is intended primarily for lunch rooms or restaurants where small quantities of bread are consumed, and where it is desired that each slice be fresh.

A further object of my invention is to provide a bread cutter of the character described, in which particularly novel means is employed for revolving a disk cutter and for moving the cutter into engagement with the loaf of bread.

A further object of my invention is to provide a bread cutter of the character described, in which the revolvable cutting disk is entirely encased, thereby precluding the possibility of the operator cutting his or her hands during the operation of the device.

A further object of my invention is to provide a device of the type described, which is simple in construction, durable, and thoroughly practical commercially.

Other objects and advantages will appear in the following specification, and the novel features of the invention will be particularly pointed out in the appended claims.

My invention is illustrated in the accompanying drawings, forming part of this application, in which—

Figure 1 is a front elevation of an embodiment of my invention,

Figure 2 is a rear elevation of the mechanism illustrated in Figure 1,

Figure 3 is a side elevation of the mechanism illustrated in Figure 1, and

Figure 4 is a sectional view of the loaf-advancing ratchet mechanism.

In carrying out my invention, I make use of a base 1 having uprights 2 fixed thereto. A toothed rack 3 is supported by the uprights 2 and disposed at an inclination of substantially thirty degrees. The uppermost portion of the rack 3 as shown at 4, lies in a substantially horizontal plane. A pinion 5 is in mesh with the toothed rack 3, and a guide bar 6 is disposed beneath the rack 3 parallel thereto, which is arranged to bear upon a shaft 7, upon which the pinion 5 is carried. The shaft 7 also carries a circular cutting disk 8. A block 9, loosely mounted on the shaft and concentric therewith, is pivotally connected at 10 to a draw bar 11. The outer end of the draw bar 11 is provided with a handle 12, by means of which the block 9 may be drawn downwardly, thereby causing the pinion 5 to rotate as it moves along the rack 3, and therefore cause rotation of the cutting disk 8.

As the cutting disk 8 rotates, it also moves forwardly and downwardly.

A loaf of bread 13 is placed upon the base 1 in the position shown in Figure 1, and a mill wheel 14, having transverse serrations on the peripheral wall thereof and rotatably mounted upon the base, is permitted to bear on the under surface of the loaf 13.

Means for causing the longitudinal advancement of the loaf 13 a predetermined distance each time the draw bar 11 is operated, so that a slice of predetermined thickness may be severed from the loaf by the cutting disk 8, is provided in a cam member 15 carried by the block 9 and arranged to engage with mechanism associated with the mill wheel 14.

This mechanism consists in a lever 16 pivotally mounted at 17 to a cross bar 18 disposed between the larger of the uprights 2. The lever 16 has a part 19 thereof bent outwardly (see Figure 1), which is arranged to be moved when the cam 15 engages therewith, as when the pinion 5 is at its uppermost limit of travel upon the rack 3. A compression spring 20 is disposed between the lever 16 and the rack 3, so as to restore the lever 16 to its normal position after actuation by the cam 15. The opposite end of the lever 16 carries a pawl 21, which is arranged to engage with ratchet teeth 22 on the adjacent end of the mill wheel 14, and disposed near the peripheral edge of the mill wheel.

A casing 23 is provided to entirely enclose the circular cutting disk 8 during the free movement thereof, and a casing 24 is provided for enclosing the loaf 13.

From the foregoing description of the various parts of the device, the operation thereof may be readily understood. My improved bread cutting device is extremely simple to operate. When it is desired to sever a single slice from the loaf, the operator will grasp the handle 12 and draw the handle away from the device, thus compelling rotation of the cutting disk 8 by movement of the pinion 5 along the rack 3. The cutting disk will also move downwardly and forwardly into engagement with the loaf, and thereby sever a portion therefrom. The severed slice will be uniform in thickness.

The draw bar 11 is returned to its normal position by actuation of the handle 12, and as it resumes its normal position the cam 15 will engage with the portion 19 of the lever 16, thereby causing a frictional rotation of the serrated mill wheel 14 through the pawl and ratchet mechanism 21—22. This will advance the loaf 13 toward the path of the movable cutting disk, so that the next portion severed from the loaf will be of uniform thickness and precisely the same as the last. There is little danger of the operator harming himself or herself through contact with the cutting disk, since this disk is entirely encased. This feature also permits the disk to be kept clean and in a suitable condition for use.

I claim;

1. A bread cutter of the character described, comprising a base arranged to support a loaf of bread, means for moving said loaf longitudinally, a rotary disk cutter, an inclined toothed rack, a pinion associated with said cutter in mesh with said rack, and manually operated means for moving said cutter along said rack, whereby said cutter is caused to revolve and move toward said bread, said manually operated means being connected with said means for moving said bread, whereby said bread may be moved each time said disk cutter moves away from said bread.

2. A bread cutter of the type described comprising a base fashioned to support a loaf of bread, a rotary disc cutter, an inclined toothed rack supported above said base, a pinion associated with said cutter in mesh with the teeth on said rack, a draw bar having a handle portion associated with said cutter, whereby said cutter may be manually moved along said rack, thus causing said cutter to revolve and to move forwardly and downwardly toward the bread supported on said base, and a casing arranged to partially encompass said disc cutter during its entire rotating and oscillating movement.

3. A bread cutter of the type described comprising a base fashioned to support a loaf of bread, a rotary disc cutter, an inclined toothed rack having a horizontal portion at the upper end thereof, a pinion associated with said cutter in mesh with the teeth of said rack, a draw bar connected with said cutter at one end and having a handle portion at the opposite end, whereby said cutter may be moved along said rack, thus causing the cutter to rotate and move downwardly and toward said loaf of bread to sever a slice therefrom.

HANS C. GREENBROOK.